United States Patent [19]

House

[11] 4,425,244
[45] * Jan. 10, 1984

[54] ORGANOPHILIC CLAY GELLANTS

[75] Inventor: Roy F. House, Houston, Tex.

[73] Assignee: Venture Innovations, Inc., Lafayette, La.

[*] Notice: The portion of the term of this patent subsequent to May 10, 2000 has been disclaimed.

[21] Appl. No.: 342,099

[22] Filed: Jan. 25, 1982

Related U.S. Application Data

[63] Continuation-in-part of Ser. No. 292,408, Aug. 13, 1981, and Ser. No. 292,409, Aug. 13, 1981.

[51] Int. Cl.$^3$ .......................... C10M 5/20; C10M 5/24
[52] U.S. Cl. .................................... 252/28; 252/49.5; 252/315.2
[58] Field of Search .................... 252/28, 49.5, 315.2, 252/316

[56] References Cited

U.S. PATENT DOCUMENTS

| | | | |
|---|---|---|---|
| 3,654,171 | 4/1972 | Emond et al. | 252/28 |
| 3,755,166 | 8/1973 | Abbott et al. | 252/28 |
| 3,812,937 | 5/1974 | Abbott et al. | 252/28 |
| 4,040,974 | 8/1977 | Wright et al. | 252/28 |
| 4,116,866 | 9/1978 | Finlayson | 252/28 |
| 4,287,086 | 9/1981 | Finlayson | 252/28 |

*Primary Examiner*—Jacqueline V. Howard
*Attorney, Agent, or Firm*—Roy F. House

[57] ABSTRACT

The invention provides methods of preparing organophilic clays having enhanced dispersibility in organic liquids, the organophilic clay containing gellants, and methods of increasing the viscosity of organic liquids utilizing these gellants.

21 Claims, No Drawings

ORGANOPHILIC CLAY GELLANTS

This patent application is a continuation-in-part of co-pending patent application Ser. No. 292,408 filed on Aug. 13, 1981, and of copending patent application Ser. No. 292,409 filed on Aug. 13, 1981, both of which are incorporated herein by reference for all purposes including obtaining the benefit of the earlier filing date for all inventions claimed herein which were disclosed in the co-pending applications.

The present invention relates to organophilic clays, particularly organophilic clay gellants of the type obtained by reacting smectite clay with a quaternary cationic organic compound, and methods of preparing such organophilic clays.

It is well known that organic compounds which contain a cation will react with clays which have an anionic surface and exchangeable cations to form organoclays. Depending on the structure and quantity of the organic cation and the characteristics of the clay, the resulting organoclay may be organophilic and hence have the property of swelling or dispersing and gelling in certain organic liquids depending on the concentration of organoclay, the degree of shear applied, and the presence of a dispersant. See for example the following U.S. patents, all incorporated herein by reference for all purposes: U.S. Pat. Nos. 2,531,427 (Hauser); 2,966,506 (Jordan); 4,105,578 (Finlayson and Jordan); 4,208,218 (Finlayson); and the book "Clay Mineralogy", 2nd Edition, 1968 by Ralph E. Grim, McGraw-Hill Book Co., Inc., particularly Chapter 10—Clay Mineral-Organic Reactions, pp. 356–368—Ionic Reactions, Smectite, and pp. 392–401—Organophilic Clay-Mineral Complexes.

Many uses have been proposed for organophilic clays, particularly as thickeners and/or suspending agents in oleaginous liquids, such as for example, in oil base drilling fluids, oil base packer fluids, greases and the like. Such uses are disclosed in several U.S. patents including: U.S. Pat. Nos. 2,531,812 (Hauser); 3,831,678 (Mondshine); 3,537,994 (House); and others referenced herein.

Despite the myriad of organoclays disclosed in the prior art, there are relatively few which have found any appreciable utility. The organoclays available commercially utilize either montmorillonite (particularly bentonite), hectorite or attapulgite as the clay reactant and a quaternary ammonium salt selected from the group consisting of dimethyl dihydrogenatedtallow ammonium chloride, dimethyl benzyl hydrogenatedtallow ammonium chloride, methyl benzyl dihydrogenatedtallow ammonium chloride, and mixtures of the first two salts as the cationic reactant.

One of the problems in utilizing any organoclay is obtaining good dispersion of the organoclay in the desired oleaginous liquid. Since the commercial introduction of organophilic clays it has become well known to gain the maximum gelling (thickening) efficiency from these organophilic clays by adding a low molecular weight polar organic material to the composition. Such polar organic materials have been variously called dispersants, dispersion aids, solvating agents, dispersion agents and the like. See for example the following U.S. Pat. Nos.: O'Halloran 2,677,661; McCarthey et. al. 2,704,276; Stratton 2,833,720; Stratton 2,879,229; Stransfield et. al. 3,294,683. An excellent review of the variables which affect the gelation of oils by organophilic clays to form greases is given by C. J. Boner in his book "Manufacture and Applications of LUBRICATING GREASES", 1954 (Reinhold Publishing Corp.), pp. 724–748—Clay Base Thickeners.

The dispersion of an organophilic clay in an oleaginous liquid is increased as the degree of shear applied to the mixture increases, particularly when a polar organic dispersant is present in the mixture. Heat may also be useful in obtaining good dispersion although heat and shear alone or in combination, without a dispersant being present, do not efficiently disperse the organoclay.

Organophilic clay gellants (hereinafter sometimes referred to as OCG) are supplied in the form of dry powders. In order to develop their useful properties, the OCG must be thoroughly dispersed, so as to get complete separation of the minute ultimate particles. This dispersion is readily obtained by applying a combination of the following three forms of energy:

1. Mechanical shear action, such as grinding, milling, and stirring.
2. Chemical energy, by the use of a properly chosen polar additive, to initiate the separation of the minute ultimate particles.
3. Temperature increase, whereby gelatin occurs more readily with application of heat to the system.

The ease with which a good OCG dispersion can be obtained is determined initially by the nature of the organic liquid used. Such factors as the polarity of the liquid, and its inherent viscosity, have an important influence upon the ready wetting of the OCG particle, and consequently upon the efficiency of the grind. For example, there is a considerable difference between ordinary mineral oil and bodied linseed oil, with respect to the total energy required in milling to form a fully gelled OCG paste. The more polar and viscous bodied linseed oil will gel readily without extensive shear or temperature requirements. On the other hand, good gels in mineral oil need more mechanical shear, combined with chemical energy, for optimum gelling.

A roller mill is highly efficient in dispersing OCG. Stiff pastes containing an OCG and vehicle alone, or mixtures of an OCG and vehicle with other solids, produce excellent gels in one or two passes over a three-roll paint mill. The roller mill is particularly useful for preparing masterbatches of OCG in typical vegetable oils, low volatility solvents, epoxy resins, polyesters, and similar vehicles.

The use of pebble or ball mills for the dispersion of the OCG is a very satisfactory technique. They are particularly useful for forming gels in solvents which may be too volatile, too fluid, or too corrosive for a roller mill. Occasionally, it is desirable to disperse the OCG by pebble milling in a non-polar solvent, without the use of polar additives. It is then easy to discharge the mill, and to gel the mixture immediately by stirring in the proper polar additive.

The colloid mill produces highly efficient organophilic clay gels. Rotary mills of this type develop high shear forces, and considerable frictional heat. OCG dispersions made with this type of equipment are gelled more efficiently than by any other means of manufacture. Colloid milling is particularly well adapted for obtaining maximum gelation where polar solvent additives are not permissible, and where relatively high melting materials such as waxes and asphaltic compounds are to be gelled.

The use of milling techniques is always preferable to stirring. Where it is not possible or practical to use mill grinding, however, mechanical stirring may be employed in many cases. The stirring equipment should be capable of developing a high rate of shear. It is important to remember that in stirring, there is a tendency to develop lumpy gels, since there is no positive mechanical action to blend partially gelled particles into a uniform product. For this reason, it is very often the best procedure to stir the OCG throughly for a short time, in order to get maximum dispersion, before adding polar solvent additives. This principle should be kept in mind where the equipment is a "Cowles Dissolver" (Morehouse-Cowles, Inc.) a "Hochmeyer DiscPerser" (Herman Hochmeyer & Co.) or other less powerful stirring devices. This represents an exception from the usual technique of pre-dampening dry OCG powder before grinding.

There are several specialized pieces of stirring equipment which are well suited for the formation of OCG gels. One example is the "Ipeco Mixer Dispersator" (Industrial Products Engineering Co.), which has a slotted bell-shaped device on the stirring shaft instead of the conventional propeller. Stirring equipment of this type has been found particularly efficient for forming OCA gels in tanks of solvent or relatively thin vehicles. Similarly, good performance is obtained with the "Eppenback Homogenizer" (Eppenbach, Inc.)

It is frequently desirable to form an efficient OCG gel in cases where sufficient shear action cannot be applied to the final product. Under these conditions, the masterbatching of OCG gels is an effective technique. Any of the stirring or grinding methods mentioned above may be used, with the optimum concentration of OCG depending upon the organic liquid and the type of equipment used. For example, a fully gelled OCG masterbatch has frequently been made for paint manufacturing, by gelling 10% OCG in a mixture of mineral spirits and alkyd vehicle. Properly made OCG masterbatches are completely stable on standing, and are convenient to store and handle.

A specialized masterbatch technique is sometimes used in the paint industry to increase the viscosity of a finished paint with OCG. A small portion of the thin paint is taken from the batch and reground with a higher than normal amount of OCG. This over-thickened paint is then used to adjust the consistency of the thin batch.

The need for mechanical shear action can be greatly reduced by the choice of a chemical additive to aid in dispersion. Strong attractive forces hold the tiny ultimate OCG platelets together tightly; they can be overcome readily by the controlled absorption of small polar molecules.

The most useful general-purpose additives are the low molecular weight alcohols, such as methanol and ethanol. The amount of alcohol to be used as polar additive is quite specific, since the object is to provide a monomolecular layer of alcohol covering the entire surface area of the OCG mineral platelets.

About 30% methyl alcohol, based on the OCG weight, gives optimum results; in the case of ethyl alcohol, optimum gelling requires about 45%, based on the weight of the OCG. When these alcohols are anhydrous, the ratio of alcohol to OCG is critical, since the peak gel strength falls off when any substantial variation in the amount of alcohol is introduced.

The peak in gel strength, versus alcohol concentration, is broadened considerably when the alcohols contain 5% water. For this reason, 95% alcohols are always recommended, to allow for slightly variations in the actual ratio of alcohol to OCG.

A typical predampening procedure which is typically used as a general practice in handling OCG is as follows:

Weigh out the required amount of OCG. Add 30% of 95-5 methyl alcoholwater, based on the weight of the OCG; to the dry powder. Mix one minute or longer. The alcohol will be absorbed completely by the OCG, resulting in a slightly dampened powder, which can be handled easily. The predampened OCG is then added to the organic system to be gelled, followed by appropriate mill grinding or high shear stirring.

The above procedure greatly increases the speed and ease of gel formation, and almost invariably results in higher gel strengths. Because of the immediate development of strong gels when using this procedure, the time necessary for milling or high shear agitation is much shorter than in the case of gel formation without polar additives.

There is one general exception to the above procedure in industrial practice. Wherever a gel is to be formed in low viscosity organic liquids, and where high shear string is the only mechanical equipment used, post addition of polar solvent is preferable. Predampening often leads to lumpy gels, where small gel particles occur with dry centers of OCG, because of rapid gelation without sufficient viscosity for developing a "rubbing out" action. In such cases, it is preferably to add the OCG to the liquid while stirring, and agitate long enough to disperse the OCG particles smoothly, as if they were so much clay or inert pigment. Then, the proper proportion of 95% alcohol is added while the stirrer is operating. This method produces smooth and high efficiency gels which are free of lumps. It is particularly useful for masterbatches in solvents or other thin liquids, and for processes where stirring equipment is the only mechanical treatment given to the OCG mixture.

In unusual cases, where the organic liquid to be gelled has poor wetting properties, the use of 30% propylene carbonate as a polar additive (based on OCG weight) should be considered. It is very effective in wetting the OCG in extremely low solvency liquids, and in some polymers where dispersion is noticeably difficult. Propylene carbonate has a high boiling point (242° C.), so that it may be used wherever the volatility or low flash points of methyl and ethyl alcohols are undesirable.

Generally in preparing oil base well working compositions, such as invert emulsion drilling, workover, completion, and packer fluids, high shear mixing equipment such as a colloid mill is not available and polar organic dispersants are not utilized. Rather the water present in the emulsion, which generally comprises from about 5% to about 50% by volume of the liquid phase, is utilized as the dispersant. While water can function as a dispersant for certain organophilic clays, it is generally a poor dispersant and inefficient thickening or suspension is obtained from the organoclay.

I have found that organophilic clays prepared by extruding a mixture or a smectite clay, a cationic organic compound, water and an alcohol having from 1 to 5 carbon atoms in certain specified ratios are readily dispersible in organic liquids provided that the organophilic clay is not dried to remove the moisture or alcohol therefrom. I have also found that the organophilic clays prepared by such an extrusion process can be provided in an even more readily dispersible form by pre-dispersing the organophilic clay in certain mixtures of water and a low molecular-weight polar organic compound which is generally a dispersant for organophilic clays. Furthermore, particulate OCG prepared by prior art procedures can be activated for enhanced dispersibility in an organic liquid by shearing the OCG in an aqueous solution of a polar organic dispersant for the OCG.

Accordingly, it is an object of this invention to provide organoclay viscosifiers which are more easily dispersed in organic liquids than prior art organoclay viscosifiers.

It is another object of this invention to provide organoclay slurry viscosifiers which are readily dispersible in oleaginous liquids comprising organoclays pre-dispersed in solutions of water and polar organic liquids.

It is still another object of this invention to provide methods for the manufacture of organoclay viscosifiers which have enhanced dispersibility in oleaginous liquids containing organophilic clays pre-dispersed in mixtures of water and water soluble polar organic liquids.

Yet another object of this invention is to provide a method of increasing the viscosity of an oleaginous liquid.

Other objects and advantages of this invention will become apparent to one skilled in the art upon reading this specification and the appended claims.

While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist especially of, or consist of the stated materials. The method can comprise, consist essentially of, or consist of the stated steps with the stated materials.

The preferred organophilic clays prepared by the process of this invention comprise the reaction product of a smectite clay and an organic quaternary compound.

The smectite clay must have a cation exchange capacity of at least 75 milliequivalents per 100 grams of 100% active clay. The preferred smectite clay is montmorillonite, particularly the naturally occurring Wyoming variety of swelling bentonite. Other smectite clays which may be useful in practicing this invention are hectorite and saponite. The clays may be converted to the sodium form if they are not already in this form. This can conveniently be accomplished by preparing an aqueous clay slurry and passing the slurry through a bed of cation exchange resin in the sodium form, optionally with centrifugation to remove the non-clay impurities from the smectite clay, and spray drying the slurry to obtain a particulate form of sodium exchanged clay. Alternately the clay can be mixed with water and a soluble sodium compound such as sodium bicarbonate, sodium carbonate, sodium hydroxide and the like, optionally with an alkaline earth metal compound selected from the group consisting of magnesium oxide, magnesium carbonate, magnesium hydroxide, calcium oxide, calcium hydroxide, and mixtures thereof, and shearing the mixture such as with a pugmill or extruder. The smectite clay may be synthesized utilizing a hydrothermal synthesis process, as is well known, however, such clays are too expensive for most industrial uses.

The cation exchange capacity of the smectite clay can be determined by the well known ammonium acetate method.

The activity of the clay must be known in order to prepare the organophilic clays of this invention. When it is desired to react the raw clay or any clay which is not 100% active, the percent active clay can be determined using the following procedure: (1) to 350 ml. of water in a stainless steel Multimixer container add 2 ml. of a 5% tetrasodium pyrophosphate solution and agitate; (2) Sift in 20 grams of ground clay and continue the agitation for 20 minutes, periodically scraping the sides of the container; (3) Withdraw from the slurry while it is being agitated two samples of approximately 20 ml. each; (4) Determine the total solids in one of the samples; (5) Pour the second sample into two 10 ml. test tubes and centrifuge the samples at 1700 rpm for one minute (6" spin diameter); (6) Pour out the supernatent phase from each tube and determine the total solids therein; (7) The percent active clay can be calculated using the following formula:

$$\% \text{ Active Clay} = \frac{\% \text{ Solids in Supernatent Phase}}{\% \text{ Solids in Original Slurry}} \times 100$$

The organic quaternary compounds useful in the practice of this invention are selected from the group consisting of quaternary ammonium salts, quaternary phosphonium salts, and mixtures thereof. Representative quaternary phosphonium salts are disclosed in the following U.S. patents, all incorporated herein by reference: U.S. Pat. Nos. 3,929,849 (Oswald) and 4,053,493 (Oswald). Representative quaternary ammonium salts are disclosed in U.S. Pat. No. 4,081,496 (Finlayson), incorporated herein by reference, in addition to the patents previously cited herein.

The preferred quaternary compounds comprise a quaternary ammonium salt having the structural formula

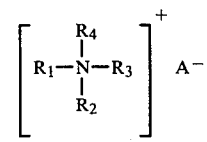

wherein $R_1$, $R_2$, $R_3$, and $R_4$ are independently selected from the group consisting of $C_aH_{2a+1-x}B_x$, $C_bH_{2b-a-x}B_x$, $C_6H_{5-x}B_xCH_2$, and mixtures thereof, $1 \leq a \leq 30$, $3 \leq b \leq 30$, $0 \leq x \leq 2$, b is a radical selected from the group consisting of OH, Cl, Br, $C_6H_5$, and mixtures thereof, and A is a charge balancing anion, provided that at least one R contains at least 12 carbon atoms, and $R_1$, $R_2$, $R_3$, and $R_4$ collectively contain at least 20 carbon atoms. Most preferably $x=0$, and B is OH when $x>0$. A is preferably selected from the group consisting of Cl, Br, I, $NO_2$, OH, $CH_3SO_4$, and mixtures thereof, most preferably Cl.

Exemplary preferred quaternary ammonium cations are selected from the group consisting of trimethyl octadecyl ammonium, trimethyl hydrogenated tallow ammonium, trimethyl ricinoleyl ammonium, diethyl didodecyl ammonium, dimethyl dioctadecyl ammonium, dimethyl dicoco ammonium, dimethyl dihydrogenated tallow ammonium, dimethyl diricinoleyl ammonium, dimethyl benzyl octadecyl ammonium, dimethyl benzyl hydrogenatedtallow ammonium, dimethyl benzyl ricinoleyl ammonium, methyl benzyl dioctadecyl ammonium, methyl benzyl dihydrogenatedtallow ammonium, methyl benzyl diricinoleyl ammonium, methyl benzyl dicoco ammonium, methyl dibenzyl octadecyl ammonium, methyl dibenzyl hydrogenatedtallow ammonium, methyl dibenzyl ricinoleyl ammonium, methyl dibenzyl coco ammonium, methyl trioctadecyl ammonium, methyl trihydrogenated tallow ammonium, methyl triricinoleyl ammonium, methyl tricoco ammonium, dibenzyl dicoco ammonium, dibenzyl dihydrogenatedtallow ammonium, dibenzyl dioctadecyl ammonium, dibenzyl diricinoleyl ammonium, tribenzyl hydrogenated tallow ammonium, tribenzyl dioctadecyl ammonium, tribenzyl coco ammonium, tribenzyl ricinoleyl ammonium, and mixtures thereof.

The amount of the organic quaternary cationic compound added to the clay must be sufficient to render the resulting organoclay useful for its intended purpose. Generally there is a specific ratio of clay and quaternary compound which provides the optimum desired property in an oleaginous medium, and this ratio will vary depending on the characteristics of the oleaginous medium. Thus, in general, as the aromaticity of the oleaginous medium increases, the ME ratio decreases. The ME ratio (milliequivalent ratio) is defined as the number of milliequivalents of the quaternary cationic compound in the organophilic clay, per 100 grams of clay, 100% active clay basis.

The preferred organophilic clays of this invention have a ME ratio from about 75 to about 120. The optimum ME ratio will depend on the particular clay and cationic quaternary compound used to prepare the organophilic clay, and on the particular oleaginous liquid in which it is desired to utilize the organophilic clay. In general, it has been found that the gelling efficiency of organophilic clays in polar organic liquids increases as the ME ratio decreases. Conversely, the gelling efficiency of organophilic clays in non-polar oleaginous liquids increases as the ME ratio increases until an optimum is reached which is generally in the range from about 90 to about 120 depending on the particular oleaginous liquid to be viscosified.

The processes of this invention result in the preparation of organophilic clays which have enhanced dispersibility as compared to prior art processes for making the organophilic clays. Thus it is anticipated that organophilic clays can be prepared by the processes of this invention which may have utility in certain oleaginous mediums and which may not have any such utility if prepared by the prior art processes. For instance, organophilic clays can be prepared at lower ME ratios by the processes of this invention than by the dispersed clay processes of the prior art, and these organophilic clays, particularly when utilized in the slurry state of this invention as disclosed hereinafter, should be dispersible in selected organic liquids to provide useful properties therein.

It is also anticipated that other organic cationic compounds can be used to prepare organoclays by the processes of this invention which would have no utility, due to a lack of dispersibility, if prepared by prior art processes. Thus it has been variously disclosed to prepare organoclays from primary amine salts, secondary amine salts, tertiary amine salts, diamine salts, partial amides of polyamines, polyquaternary ammonium compounds, and the like. However, the efficiency of these organoclays in various organic liquids is poor which is due in part to the door dispersibility of these organoclays in the organic liquids.

The invention provides an organophilic clay slurry containing from about 20% to about 50% by weight of an organophilic clay, from about 20% to about 80% by weight of an aqueous solution of a low molecular weight polar organic compound wherein the concentration of the polar organic compound is from about 2.5% to about 97.5% by weight of the solution, and from about 0% to about 40% by weight, based on the weight of the organophilic clay, of an alkali metal base.

The organophilic clay slurry can be prepared by shearing the organophilic clay in the aqueous solution of the polar organic compound (hereinafter sometimes referred to as POC).

The organophilic clay may be in a dry powdered form as commercially supplied or may be in a water-wet condition as normally prepared before drying. Thus the organophilic clay is generally prepared by dispersing a smectite clay in water, centrifuging the clay slurry to remove non-clay impurities, optionally ion-exchanging the clay to the sodium form, reacting the purified clay slurry with the cationic organic compound at a temperature in the range from about 140° F. to about 200° F., filtering the organophilic clay, washing the organophilic clay filter cake, and drying. The organophilic clay slurry may be prepared from the water-wet organophilic clay filter cake depending upon the concentration of POC desired in the aqueous solution. Thus the maximum concentration of POC which can be utilized in the organophilic clay slurry can be calculated using the following formula:

$$M = \frac{10000\,(F - S)}{F(100 - S)}$$

where
M = maximum concentration of POC in the aqueous solution
F = % organophilic clay in the filter cake
S = % organophilic clay desired in the organophilic clay slurry The maximum concentration of POC in the aqueous solution is obtained by adding the pure POC to the organophilic clay filter cake in the required amount since the water in the filter cake is used as the remainder of the aqueous solution. The aqueous solution can contain less than this maximum concentration of POC by adding water and the POC to the filter cake.

The organophilic clay can be prepared by extruding a mixture containing the clay, organic cationic compound, water, and an alcohol containing from 1 to 5 carbon atoms, and optionally, grinding the organophilic clay extrudate without drying the water or alcohol therefrom. Preferably the clay, organic cationic compound, and alcohol are intimately mixed together before adding the water thereto. As noted previously, the amount of organic quaternary compound is preferably in the range from about 75 to about 120 milliequivalents per 100 grams of clay, 100% active clay basis, and most preferably from about 80 to about 110. The amount of water present in the mixture should be from about 20% to about 100%, based on the weight of 100% active clay, and most preferably from about 30% to about 75%. The amount of alcohol should be from about 5% to about 50%, based on the weight of 100% active clay, most preferably from about 10% to about 30%.

The organophilic clay prepared by an extrusion process, for the purposes of this invention, is considered to be the combination of the moisture free clay, including the solid impurities therein, and the organic cationic compound on a 100% active basis. Thus for instance, if 100 parts of a smectite clay containing 10% moisture and 20% non-clay solid impurities were reacted with 50 parts of a 75% active quaternary ammonium chloride, then the amount of organophilic clay obtained would be 90+37.5=127.5 parts.

The term "extruding" as used in connection with the present invention is intended to mean any type of processing in which the clay, organic cationic compound, water, and alcohol are intimately mixed under sufficient pressure for the clay and organic cationic compound to react. The intensity of mixing is such that heat is evolved during the extrusion. Thus applicable equipment for conducting the extruding step are extruders, pug mills, 2-roll mills, and the like.

The amount of water and POC which are sheared with the organophilic clay must be sufficient to produce a slurry containing from about 20% to about 50% organophilic clay, from about 1.25% to about 78% water, and from about 1.25% to about 78% of POC, wherein the water to POC ratio is in the range from about 97.5/2.5 to about 2.5/97.5.

When the organophilic clay slurry is prepared using a water-wet organophilic clay such as the filter cake or extruded product described, the maximum concentration of organophilic clay which can be pre-dispersed by shearing in the aqueous solution is less than when the organophilic clay is in the form of a dried powder. The maximum concentration of organophilic clay in the slurry of this invention when prepared from a water-wet source of organoclay will be about 40% by weight of the slurry in the absence of a deflocculant for the organoclay.

The POC which are useful in this invention are water soluble low molecular weight polar organic compounds preferably selected from the group consisting of alcohols, ketones, nitroalkanes, alkylene carbonates, amides, nitriles, esters, compounds containing mixtures of these polar functional groups, and mixtures thereof. Most preferably, the alcohols contain from 1 to about 6 carbon atoms, the ketones contain from 3 to about 6 carbon atoms, the nitroalkanes contain from 1 to about 3 carbon atoms, the alkylene carbonates contain from 3 to about 5 carbon atoms, the amides contain from 1 to about 4 carbon atoms, the nitriles contain from 2 to about 4 carbon atoms, and the esters contain from 2 to about 4 carbon atoms. Non-limiting exemplary POC include methanol, ethanol, the propanols, the butanols, the pentanols, the hexanols, acetone, methyl ethyl ketone, diethyl ketone, methyl propyl ketone, methyl isobutyl ketone, nitromethane, nitroethane, nitropropane, ethylene carbonate, propylene carbonate, formamide, dimethyl formamide, acetamide, dimethyl acetamide, methyl nitrile, ethyl nitrile, propyl nitrile, methyl formate, ethyl formate, methyl acetate, ethyl acetate, and the like.

The preferred concentration of POC in the organophilic clay slurries of this invention is dependent upon the composition of the organophilic clay and upon the composition of the particular POC desired. Generally as the molecular weight of the POC in a homologous series of like compounds increases, the optimum concentration of POC in the slurry decreases. Thus the following concentrations of selected POC are preferred:

| Polar Organic Compounds | Optimum Concentration Range |
| --- | --- |
| Methanol | From about 20% to about 65% |
| Ethanol | From about 10% to about 65% |
| Propanols | From about 2.5% to about 50% |
| Butanols | From about 2.5% to about 35% |
| Pentanols | From about 2.5% to about 20% |
| Acetone | From about 40% to about 95% |
| Methyl Ethyl Ketone | From about 30% to about 95% |
| Dimethyl Formamide | From about 30% to about 85% |

The optimum concentration of POC in the aqueous solution is readily determined for any specific organophilic clay and any specific organic liquid in which it is desired to use the organophilic clay by mixing the organophilic clay, water, and the POC together in a higher shear mixer such as a Waring Blendor. Various pre-dispersed organoclay slurries can be prepared by maintaining the organoclay concentration constant while varying the water/POC ratio. Evaluation of the slurries in the organic liquid for the desired physical property, such as viscosity, will indicate the optimum concentration of POC in the slurry.

As a further embodiment of this invention, I have found that the addition of an alkali metal base to the organophilic clay slurries of this invention increases the viscosifying characteristics of the organophilic clay. Generally from 0% to about 40%, based on the weight of the organophilic clay, produces optimum results, preferably from 0% to about 20%. The preferred alkali metal base is selected from the group consisting of sodium hydroxide, sodium carbonate, potassium hydroxide, potassium carbonate, ammonium hydroxide, ammonium carbonate, and mixtures thereof, most preferably sodium carbonate or sodium hydroxide.

The alkali metal base can be added to the water used in preparing the organophilic clay by the extrusion process disclosed herein. The organophilic clay containing the alkali metal base so produced exhibits enhanced viscosification characteristics as compared to the organophilic clay containing no alkali metal base. Thus it is another embodiment of this invention to produce an organophilic clay by the method which comprises extruding a mixture containing a smectite clay, from about 75 to about 120 milliequivalents per 100 grams of 100% active clay of a quaternary compound selected from the group consisting of quaternary ammonium salts, quaternary phosphonium salts, and mixtures thereof, from about 15% to about 100%, based on the weight of 100% active clay, of water, from about 5% to about 50%, based on the weight of 100% active clay, of an alcohol containing from 1 to 5 carbon atoms, and from about 0% to about 20%, based on the weight of the organophilic clay (i.e. the combined weight of the moisture free clay and the quaternary ammonium salt), of an alkali metal base, and thereafter grinding the organophilic clay, preferably without drying the water or alcohol therefrom, or, optionally, after removing the water and alcohol therefrom to form a dry, particulate organoclay.

The organophilic clays of this invention, whether in particulate or slurry form, are useful as thickeners or suspending agents in organic liquids. The preferred organophilic clays are efficient thickeners or suspending agents in oleaginous liquids, particularly for use in oil or gas well drilling fluids, workover fluids, completion fluids, coring fluids, packer fluids, and the like. Such fluids are well known.

A further embodiment of this invention is to provide a method of increasing the viscosity of an organic liquid which comprises mixing with the organic liquid either the particulate organoclay gellant of this invention or the organoclay gellant slurry of this invention. Thus in its broadest aspects, the invention comprises a method for increasing the viscosity of an organic liquid which comprises either:

A. extruding a mixture containing a clay, an organic cationic compound, water, an alcohol containing from 1 to 5 carbon atoms, and an alkali metal base, and thereafter dispersing a viscosifying amount of the organophilic clay-containing extrudate into the organic liquid; or B. shearing an organophilic clay in an aqueous solution of a POC to form a pre-dispersed organophilic clay slurry, and thereafter dispersing a viscosifying amount of the slurry into the organic liquid.

As a further embodiment of this invention, it has been found that a deflocculant for the organophilic clay can be added to the organophilic clay gellant slurry to decrease the viscosity of the slurry, thus allowing a larger concentration of organophilic clay to be present in the slurry. Suitable deflocculants are lignite salts, lignosulfonate salts, alkali metal polyphosphates, tannins, and the like known deflocculants for clays.

The following examples illustrate specific preferred embodiments of the invention and are not intended to be limiting.

EXAMPLE 1

Organophilic clay slurries were prepared by mixing together 25 parts by weight of BENTONE 34 (dimethyl dihydrogenatedtallow ammonium bentonite, product of NL Chemicals/NL Industries, Inc.) and 75 parts by weight of various aqueous solutions of various polar organic compounds as indicated in Table 1 for five minutes with a Waring Blendor. The slurries were evaluated at a concentration of 40 pounds per 42 gallon barrel (ppb), i.e. 10 ppb of organophilic clay, in diesel oil by mixing 40 grams of slurry with 310 milliliters of diesel oil for five minutes and fifteen minutes on a Multimixer. The API RP 13B rheological data obtained are given in Table 1.

The data indicate that the organophilic clay slurries within the following concentration ranges exhibited superior viscosification characteristics as compared to the slurries containing only water or only the polar organic compound:

| Polar Organic Compounds (POC) | Water/POC Range |
|---|---|
| Methanol | 75/25–5/95 |
| Isopropanol | >90/10–<5/95 |
| 1-pentanol | >95/5–<70/30 |
| Acetone | <50/50–<5/95 |
| Methyl Ethyl Ketone | <65/35–<50/50 |
| Dimethyl Formamide | >90/10–<50/50 |

The data further suggest that the operable and preferred concentration of polar organic compound in the aqueous solution in the organophilic clay slurries is as follows:

| Polar Organic Compound (POC) | % POC in Aqueous Solution | |
|---|---|---|
| | Operable | Preferred |
| $CH_3OH$ | 20–95 | 25–80 |
| $C_2H_5OH$ | 10–75 | 15–50 |
| $C_3H_7OH$ | 2.5–50 | 5–35 |
| $C_4H_9OH$ | 2.5–35 | 2.5–25 |
| $C_5H_{11}OH$ | 2.5–20 | 2.5–15 |
| Acetone | 40–95 | 50–95 |
| Methyl Ethyl Ketone | 30–95 | 40–80 |
| Dimethyl Formamide | 30–85 | 40–75 |

EXAMPLE 2

Organophilic clay slurries were prepared and evaluated as in Example 1 except that the organophilic clay was CLAYTONE IMG (dimethyl dihydrogenatedtallow ammonium bentonite, product of Southern Clay Products, Inc., Gonzales, TX) and the polar organic compound was isopropanol. The data obtained are given in Table 2.

EXAMPLE 3

Organophilic clay slurries were prepared and evaluated as in Example 2 except that the organophilic clay was CLAYTONE 34 (dimethyl dihydrogenatedtallow ammonium bentonite). The slurries were also evaluated after aging at room temperatures, 72° F., for 42 days. The data obtained are given in Table 3.

TABLE 1

Evaluation of 25% BENTONE 34 Slurries In Various Water/Solvent Mixtures

| Solvent | Water/Solvent Ratio In Slurry | API Rheology in Diesel Oil | | | |
|---|---|---|---|---|---|
| | | 5 Minutes | | 15 Minutes | |
| | | AV | YP | AV* | YP |
| Isopropanol | 90/10 | 74 | 112 | 112 | 212 |
| Isopropanol | 80/20 | 106.5 | 175 | 121.5 | 209 |
| Isopropanol | 70/30 | 102.5 | 175 | 120 | 214 |
| Isopropanol | 50/50 | 91.5 | 151 | 102 | 176 |
| Isopropanol | 20/80 | 80 | 134 | 82.5 | 141 |
| Isopropanol | 5/95 | 81.5 | 125 | 89 | 156 |
| Isopropanol | 0/100 | 40 | 50 | 47 | 68 |
| Methanol | 90/10 | 18.5 | 0 | 25.5 | 19 |
| Methanol | 80/20 | 35 | 32 | 87.5 | 115 |
| Methanol | 70/30 | 90 | 132 | 129 | 188 |
| Methanol | 50/50 | 135 | 242 | 146.5 | 263 |
| Methanol | 35/65 | 135 | 216 | 131.5 | 237 |
| Methanol | 5/95 | 69.5 | 121 | 95 | 172 |
| Methanol | 0/100 | 44 | 48 | 92.5 | 163 |
| 1-Pentanol | 95/5 | 102.5 | 175 | 120 | 218 |
| 1-Pentanol | 90/10 | 105 | 170 | 115 | 216 |
| 1-Pentanol | 80/20 | 75 | 130 | 80 | 148 |
| 1-Pentanol | 70/30 | 57.5 | 93 | 59.5 | 107 |
| Acetone | 90/10 | 13 | 8 | 22 | 10 |
| Acetone | 80/20 | 12 | 4 | 20 | 10 |
| Acetone | 70/30 | 18 | 8 | 32.5 | 29 |
| Acetone | 50/50 | 80.5 | 99 | 91 | 150 |
| Acetone | 35/65 | 136 | 230 | OS | — |
| Acetone | 5/95 | 127.5 | 215 | OS | — |
| Acetone | 0/100 | 127.5 | 219 | 144 | 262 |
| Methyl Ethyl Ketone | 90/10 | 10 | 4 | 20 | 12 |
| Methyl Ethyl Ketone | 80/20 | 8 | 2 | 13 | 6 |
| Methyl Ethyl Ketone | 65/35 | 52.5 | 57 | 75 | 120 |
| Methyl Ethyl Ketone | 50/50 | 131.5 | 227 | 135 | 244 |
| Methyl Ethyl Ketone | 0/100 | 117 | 156 | 117.5 | 159 |
| Dimethyl Formamide | 90/10 | 16 | 8 | 38.5 | 45 |
| Dimethyl Formamide | 80/20 | 22.5 | 9 | 59.5 | 67 |
| Dimethyl Formamide | 70/30 | 31 | 28 | 97 | 114 |
| Dimethyl Formamide | 50/50 | 66.5 | 95 | 109 | 192 |
| Dimethyl Formamide | 0/100 | 31.5 | 45 | 27 | 32 |
| None | 100/0 | 15 | 9 | 31 | 30 |

*OS = off scale, AV > 150

TABLE 2

Evaluation of 25% CLAYTONE IMG Slurries in Water/Isopropanol Solutions

| Water/IPA Ratio In Slurry | API Rheology in Diesel Oil | | | |
|---|---|---|---|---|
|  | 5 Minutes | | 15 Minutes | |
|  | AV | YP | AV | YP |
| 100/0 | 73 | 112 | 117.5 | 213 |
| 95/5 | 94.5 | 163 | 116 | 218 |
| 90/10 | 95 | 172 | 110 | 200 |
| 80/20 | 81.5 | 141 | 99 | 182 |
| 10/90 | 50 | 78 | 48.5 | 79 |
| 0/100 | 20 | 20 | 32 | 44 |

TABLE 3

Evaluation of 25% CLAYTONE 34 Slurries in Water/Isopropanol Solutions

| Water/IPA Ratio In Slurry | Days Aged @ 72° F. | API Rheology in Diesel Oil | | | |
|---|---|---|---|---|---|
|  |  | 5 Minutes | | 15 Minutes | |
|  |  | AV | YP | AV* | YP |
| 100/0 | 0 | 17 | 8 | 29.5 | 29 |
| 90/10 | 0 | 37.5 | 49 | 105 | 168 |
| 80/20 | 0 | 102.5 | 185 | 139 | 260 |
| 70/30 | 0 | 105 | 180 | 135 | 246 |
| 10/90 | 0 | 57.5 | 85 | 67.5 | 107 |
| 0/100 | 0 | 10 | 6 | 17.5 | 15 |
| 100/0 | 42 | 25 | 17 | 65 | 90 |
| 90/10 | 42 | 105.5 | 197 | OS | — |
| 80/20 | 42 | 136.5 | 249 | OS | — |
| 70/30 | 42 | 115 | 200 | 144 | 264 |
| 10/90 | 42 | 51.5 | 77 | 67.5 | 113 |
| 0/100 | 42 | 9.5 | 7 | 19.5 | 21 |

*OS = off-scale, AV > 150

EXAMPLE 4

Organophilic clay slurries were prepared and evaluated as in Example 1 except that various quantities of sodium hydroxide or potassium hydroxide were added to the slurries, and a different sample of BENTONE 34 was used to prepare the slurries. The data obtained are given in Table 4.

EXAMPLE 5

Organophilic clay slurries were prepared and evaluated as in Example 4 except that the organophilic clay was TIXOGEL VP (dimethyl dihydrogenatedtallow ammonium bentonite, product of United Catalysts, Inc., Louisville, KY), The data obtained are given in Table 5.

EXAMPLE 6

Organophilic clay slurries were prepared and evaluated as in Example 4 except that either GELTONE (technical grade dimethyl dihydrogenatedtallow ammonium bentonite, product of NL Baroid/NL Industries, Inc.) or GELTONE II (technical grade methyl benzyl dihydrogenatedtallow ammonium bentonite) were used as the organophilic clay. The data obtained are given in Table 6.

EXAMPLE 7

The viscosification characteristics of several of the organophilic clay slurries of Examples 1-6 were compared with the organophilic clays as received (dry powders). The dry powders were evaluated in a mixture of 310 milliliters of diesel oil, 10 grams of organophilic clay, and 30 grams of an aqueous solution having the water/isopropanol ratio indicated in Table 7 for the corresponding organophilic clay slurry by mixing for 15 minutes with a Multimixer. The data obtained are given in Table 7.

TABLE 4

Evaluation of 25% BENTONE 34 Slurries in Water/Isopropanol Mixtures

| Water/IPA Ratio in Slurry | % NaOH* | % KOH* | API Rheology in Diesel Oil | | | |
|---|---|---|---|---|---|---|
|  |  |  | 5 Minutes | | 15 Minutes | |
|  |  |  | AV** | YP | AV | YP |
| 100/0 | 0 | 0 | 26 | 22 | 61.5 | 77 |
| 90/10 | 0 | 0 | 72.5 | 115 | 107 | 196 |
| 80/20 | 0 | 0 | 117.5 | 207 | 134 | 240 |
| 70/30 | 0 | 0 | 67.5 | 109 | 94 | 160 |
| 50/50 | 0 | 0 | 38.5 | 53 | 62.5 | 93 |
| 35/65 | 0 | 0 | 42 | 66 | 55.5 | 79 |
| 80/20 | 2.5 | 0 | OS | — | — | — |
| 80/20 | 5.0 | 0 | 130 | 188 | 147.5 | 213 |
| 80/20 | 15.0 | 0 | OS | — | — | — |
| 80/20 | 5.0 | 5.0 | 94 | 130 | 127 | 208 |
| 80/20 | 0 | 10.0 | 32 | 36 | 56.5 | 81 |

*based on the weight of organoclay
**OS = off-scale, AV > 150

TABLE 5

Evaluation of 25% Tixogel VP Slurries in Water/Isopropanol Mixtures

| Water/IPA Ratio in Slurry | % NaOH* | % KOH* | API Rheology in Diesel Oil | | | |
|---|---|---|---|---|---|---|
|  |  |  | 5 Minutes | | 15 Minutes | |
|  |  |  | AV** | YP | AV** | YP |
| 100/0 | 0 | 0 | 26 | 26 | 53 | 82 |
| 95/5 | 0 | 0 | 35.5 | 43 | 71.5 | 97 |
| 90/10 | 0 | 0 | 49.5 | 67 | 75.5 | 119 |
| 80/20 | 0 | 0 | 46.5 | 57 | 62.5 | 109 |
| 70/30 | 0 | 0 | 34.5 | 41 | 60 | 82 |
| 80/20 | 0.5 | 0 | 115 | 196 | 127 | 212 |
| 80/20 | 1.5 | 0 | 149 | 242 | OS | — |
| 80/20 | 2.5 | 0 | 149 | 248 | OS | — |
| 80/20 | 5.0 | 0 | OS | — | — | — |
| 80/20 | 10.0 | 0 | 142 | 202 | OS | — |
| 80/20 | 20.0 | 0 | OS | — | — | — |
| 80/20 | 40.0 | 0 | 110 | 160 | 119 | 182 |
| 100/0 | 2.5 | 0 | 31.5 | 27 | 83.5 | 115 |
| 100/0 | 10.0 | 0 | 16.5 | 11 | 30.5 | 31 |
| 80/20 | 0 | 2.5 | 136.5 | 227 | 147 | 253 |
| 80/20 | 0 | 5.0 | 142.5 | 227 | OS | — |
| 80/20 | 0 | 10.0 | 88 | 132 | 120.5 | 193 |

*based on the weight of organoclay
**off-scale, AV > 150

TABLE 6

Effect of NaOH on the Viscosification Characteristics of Pre-dispersed Organoclay Slurries Containing 25% Organoclay in an 80/20 Mixture of Water/Isopropanol

| Organoclay | % NaOH* | API Rheology in Diesel Oil | | | |
|---|---|---|---|---|---|
|  |  | 5 Minutes | | 15 Minutes | |
|  |  | AV | YP | AV | YP |
| GELTONE | 0 | 76.5 | 135 | 81.5 | 133 |
| GELTONE | 5.0 | 106.5 | 143 | 127.5 | 153 |
| GELTONE | 12.5 | 104 | 152 | 136.5 | 193 |
| GELTONE | 20.0 | 120 | 170 | 137.5 | 185 |
| GELTONE II | 0 | 35.5 | 45 | 42 | 66 |
| GELTONE II | 2.5 | 60 | 70 | 66 | 72 |
| GELTONE II | 10.0 | 86.5 | 113 | 92.5 | 115 |
| GELTONE II | 20.0 | 84 | 108 | 88.5 | 113 |

*based on the weight of organoclay

TABLE 7

Comparative Data of Various Organoclays in Viscosifying Diesel Oil, Dry Powder v. Slurry Form

| Organoclay | Form | Slurry Water/IPA Ratio | Days Aged @ 72° F. | API Rheology AV* | YP |
|---|---|---|---|---|---|
| CLAYTONE 34 | Powder | — | — | 140.5 | 259 |
|  | Slurry | 80/20 | 0 | 130 | 260 |
|  | Slurry | 80/20 | 42 | OS | — |
| BENTONE 34 | Powder | — | — | 134.5 | 221 |
|  | Slurry | 80/20 | 0 | 137 | 250 |
|  | Slurry | 80/20 | 42 | OS | — |
| CLAYTONE IMG | Powder | — | — | 107.5 | 175 |
|  | Slurry | 95/5 | 0 | 116 | 218 |
| BENTONE 34 | Powder | — | — | 67.5 | 113 |
|  | Slurry | 80/20 | 0 | 134 | 240 |
|  | Slurry | 80/20 | 65 | 130 | 242 |
| TIXOGEL VP | Powder | — | — | 52.5 | 75 |
|  | Slurry | 90/10 | 0 | 75.5 | 119 |
| PERCHEM DMB | Powder | — | — | 67.5 | 103 |
|  | Slurry | 80/20 | 0 | 87.5 | 137 |
| GELTONE | Powder | — | — | 50.5 | 69 |
|  | Slurry | 80/20 | 0 | 81.5 | 133 |
|  | Slurry | 80/20 | 65 | 81.5 | 149 |
| GELTONE II | Powder | — | — | 37.5 | 45 |
|  | Slurry | 80/20 | 0 | 42 | 66 |

*OS = off-scale, AV > 150

The data in the examples indicate the excellent viscosification characteristics of the organophilic clay slurries of my invention. The optimum concentration of the polar organic compound in the aqueous solution varies depending on the characteristics of the organophilic clay. The viscosification characteristics of the slurries appear to the enhanced upon aging. The addition of minor amounts of alkali metal bases, especially sodium hydroxide, increases the viscosity development obtained with the slurries.

EXAMPLE 8

Organoclay samples were prepared by mixing together 59 parts of AQUAGEL bentonite (containing 53.7 parts of moisture free clay or 46.1 parts of 100% active bentonite) and 30.0 parts of dimethyl dihydrogenatedtallow ammonium chloride, 80% active in an 18/7 weight ratio solution of isopropanol/water, in a Waring Blendor. 15 parts of water and various concentrations of sodium carbonate, as indicated in Table 8, were added and mixed in a Waring Blendor. The mixtures obtained were extruded by passing them three times through a laboratory extruder. The samples thus contained 47.7% water and 9.4% isopropanol, based on the weight of 100% active bentonite.

The organoclay samples were evaluated as gellants for diesel oil by mixing together for ten minutes on a Multimixer the following: 225.7 parts by weight diesel oil; sufficient sample to give 10.0 parts of organoclay, moisture and isopropanol free basis (i.e., dimethyl dihydrogenatedtallow ammonium chloride plus moisture free clay); and sufficient water such that the composition contained 24.5 parts total water. The rheology of the compositions were obtained with a Fann Model 35 Viscometer in accordance with the American Petroleum Institute's Standard Test Procedure RP 13B. The data obtained are given in Table 8.

EXAMPLE 9

The organoclay samples of Example 8 were sheared in a Waring Blendor with sufficient isopranol and water to produce organoclay slurries containing 25% organoclay in an aqueous solution containing 85% water and 15% isopropanol. These slurries were evaluated as gellants for diesel oil by mixing together 310 milliliters of diesel oil with 40 grams of slurry on a Multimixer. The API rheolgical data were determined after 5 minutes and 15 minutes mixing. Thereafter, the slurries were aged 36 days at 72° F. and re-evaluated. The data obtained are given in Table 9.

EXAMPLE 10

Organoclay samples were prepared by the procedure of Example 8 wherein there were used 88.5 parts of the AQUAGEL Wyoming bentonite, 48.0 parts of the dimethyl dihydrogenatedtallow ammonium chloride (80% active), 21.6 parts of water, and various concentrations of sodium carbonate as indicated in Table 10. The organophilic clays were evaluated as gellants for diesel oil by mixing together for five minutes on a Multimixer 13.7 grams of sample and 310 milliliters of diesel oil. 4.7 grams of isopropanol were added and mixed five minutes. Thereafter 21.6 grams of water were added and mixed five minutes. The API rheological data were obtained after each five minutes mixing period. The data obtained are given in Table 10.

The data in these tables indicate the enhanced viscosity development obtained upon adding sodium carbonate to the organoclays produced by this extrusion process.

EXAMPLE 11

Organoclay sample 8-1 of Example 8 was sheared in a Waring Blendor with various aqueous solutions as indicated in Table 11 to produce organoclay slurries containing 25% organoclay (33.4% of Sample 8-1). These slurries were evaluated by the procedure of Example 9. The data obtained are given in Table 11.

TABLE 8

Evaluation of Extruded Organoclays Containing Sodium Carbonate

| Sample Number | Sample Composition %* $Na_2CO_3$ | % Organoclay | % IPA | % Water | ppb. Sample | Diesel Oil Gel API Rheology AV | YP | GS |
|---|---|---|---|---|---|---|---|---|
| 8-1 | 0 | 74.7 | 5.8 | 19.5 | 13.4 | 50 | 64 | 47 |
| 8-2 | 2.5 | 73.3 | 5.7 | 19.2 | 13.6 | 72.5 | 115 | 80 |
| 8-3 | 3.85 | 72.6 | 5.6 | 19.0 | 13.8 | 65.5 | 99 | 71 |
| 8-4 | 5.1 | 71.9 | 5.55 | 18.85 | 13.9 | 55 | 82 | 59 |

*based on the weight of organoclay

TABLE 9

Evaluation of Organoclay Slurries Containing 25% Organoclay in an 85/15 Water/Isopropanol Solution

| Organoclay | Slurry Composition % Organoclay Sample | Days Slurry Aged | API Rheology 5 Minutes AV | YP | 15 Minutes AV | YP |
|---|---|---|---|---|---|---|
| 8-1 | 33.5 | 0 | 43.5 | 59 | 53 | 84 |

TABLE 9-continued

Evaluation of Organoclay Slurries Containing 25% Organoclay in an 85/15 Water/Isopropanol Solution

| Slurry Composition | | Days Slurry Aged | API Rheology | | | |
|---|---|---|---|---|---|---|
| | | | 5 Minutes | | 15 Minutes | |
| Organoclay Sample | % Organoclay | | AV | YP | AV | YP |
| 8-2 | 34.1 | 0 | 54.5 | 77 | 67 | 102 |
| 8-3 | 34.4 | 0 | 53.5 | 73 | 61.5 | 97 |
| 8-4 | 34.8 | 0 | 49.5 | 71 | 60.5 | 91 |
| 8-1 | 33.5 | 36 | 32.5 | 39 | 40 | 56 |
| 8-2 | 34.1 | 36 | 47.5 | 67 | 62.5 | 95 |
| 8-3 | 34.4 | 36 | 47.5 | 65 | 60 | 90 |
| 8-4 | 34.8 | 36 | 50 | 70 | 65 | 100 |

TABLE 10

Evaluation of Extruded Organoclays Containing Sodium Carbonate

| Sample | Grams $Na_2CO_3$ | %* $Na_2CO_3$ | A Diesel Oil | | | B A IPA | | | C B Water | | |
|---|---|---|---|---|---|---|---|---|---|---|---|
| | | | AV | YP | GS | AV | YP | GS | AV | YP | GS |
| 10-1 | 0 | 0 | 27.5 | 27 | 19 | 24 | 26 | 16 | 51 | 70 | 54 |
| 10-2 | 2 | 1.7 | 45 | 50 | 38 | 46 | 50 | 35 | 59 | 84 | 67 |
| 10-3 | 3 | 2.5 | 60 | 64 | 53 | 66 | 96 | 60 | 73 | 114 | 83 |
| 10-4 | 5 | 4.2 | 42 | 42 | 34 | 56.5 | 77 | 48 | 59 | 90 | 64 |

*% based on the weight of organoclay, moisture and IPA free basis

TABLE 11

Evaluation of Organoclay Slurries Containing 25% Organoclay in Various Aqueous Solutions

| % Polar Organic Compound | % Polar Organic Compound Plus IPA In Slurry | % Water In Slurry | Diesel Oil Gels API Rheology | | | |
|---|---|---|---|---|---|---|
| | | | 5 Minutes | | 15 Minutes | |
| | | | AV | YP | AV | YP |
| Amyl Alcohol | 7.5 | 67.5 | 42 | 52 | 46 | 68 |
| Acetone | 37.5 | 37.5 | 57.5 | 73 | 65 | 112 |
| Methyl Ethyl Ketone | 37.5 | 37.5 | 60 | 72 | 63 | 94 |
| Dimethyl Formamide | 37.5 | 37.5 | 35 | 46 | 35 | 50 |

EXAMPLE 12

An organoclay slurry containing 40% CLAYTONE IMG organobentonite in an 80/20 aqueous isopropanol solution was prepared containing 0.67% of VEN-VIS 501 suspension additive (45% XC Polymer xanthan gum in a thickened mineral oil). The slurry exhibited excellent stability with very little settling upon aging at 72° F.

I claim:

1. An organoclay slurry comprising from about 20% to about 50% by weight of an organophilic clay, from about 50% to about 80% by weight of an aqueous solution of a low molecular weight polar organic compound wherein the concentration of said compound is from about 2.5% to about 97.5% by weight of said solution, and from 0% to about 40%, based on the weight of said organophilic clay, of an alkali metal base selected from the group consisting of sodium carbonate, potassium carbonate, ammonium carbonate, and mixtures thereof, wherein said solution contains:
   (a) from about 20% to about 65% methanol when said compound is methanol;
   (b) from about 10% to about 65% ethanol when said compound is ethanol;
   (c) from about 2.5% to about 50% of an alcohol containing three carbon atoms when said compound is said alcohol;
   (d) from about 2.5% to about 35% of an alcohol containing four carbon atoms when said compound is said alcohol; and
   (e) from about 2.5% to about 20% of an alcohol containing five carbon atoms when said compound is said alcohol.

2. The slurry of claim 1 wherein said compound is selected from the group consisting of alcohols containing from 1 to 6 carbon atoms, ketones containing from 3 to 5 carbon atoms, nitroalkanes containing from 1 to 3 carbon atoms, alkylene carbonates containing from 3 to 5 carbon atoms, amides containing from 1 to 4 carbon atoms, nitriles containing from 2 to 4 carbon atoms, esters containing from 2 to 4 carbon atoms, and mixtures thereof.

3. The slurry of claim 1 wherein said aqueous solution contains from about 20% to about 65% of methanol.

4. The slurry of claim 1 wherein said aqueous solution contains from about 10% to about 65% of ethanol.

5. The slurry of claim 1 wherein said aqueous solution contains from about 2.5% to about 50% of an alcohol containing three carbon atoms.

6. The slurry of claim 1 wherein said aqueous solution contains from about 2.5% to about 35% of an alcohol containing four carbon atoms.

7. The slurry of claim 1 wherein said aqueous solution contains from about 2.5% to about 20% of an alcohol containing five carbon atoms.

8. The slurry of claim 1 wherein said aqueous solution contains from about 40% to about 95% of acetone.

9. The slurry of claim 1 wherein said aqueous solution contains from about 30% to about 95% of methyl ethyl ketone.

10. The slurry of claim 1 wherein said aqueous solution contains from about 30% to about 85% of dimethyl formamide.

11. The slurry of claim 1, 2, 3, 4, 5, 6, 7, 8, 9, or 10, which contains from about 0.5% to about 25%, based on the weight of said organophilic clay, of said alkali metal base.

12. The slurry of claim 1, 2, 3, 4, 5, 6, 7, 8, 9, or 10, wherein said organophilic clay is the reaction product of a smectite clay selected from the group consisting of montmorillonite, hectorite, saponite, stevensite, and mixtures thereof, and a quaternary ammonium compound comprising a quaternary ammonium cation and an anion having the structural formula:

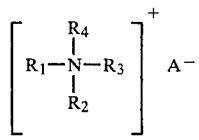

where A is an anion selected from the group consisting of Cl, Br, I, $NO_2$, OH, $NO_3$, $CH_3SO_4$, and mixtures thereof, and $R_1$, $R_2$, $R_3$, and $R_4$ are independently selected from the group consisting of $C_aH_{2a+1-x}B_x$, $C_bH_{2b-1-x}B_x$, $C_6H_{5-x}B_xCH_2$, and mixtures thereof, where $1 \leq a \leq 30$, $3 \leq b \leq 30$, $0 \leq x \leq 2$, and B is a radical selected from the group consisting of OH, Cl, Br, $C_6H_5$ and mixtures thereof, wherein at least one R contains at least 12 carbon atoms, and wherein said quaternary ammonium contains at least 20 carbon atoms.

13. The slurry of claim 12 wherein the quaternary ammonium cation is selected from the group consisting of trimethyl octadecyl ammonium, trimethyl ricinoleyl ammonium, dimethyl didodecyl ammonium, dimethyl diotadecyl ammonium, dimethyl dicoco ammonium, dimethyl dihydrogenated tallow ammonium, dimethyl diricinoleyl ammonium, dimethyl benzyl octadecyl ammonium, dimethyl benzyl hydrogenated tallow ammonium, dimethyl benzyl ricinoleyl ammonium, methyl benzyl dioctadecyl ammonium, methyl benzyl dihydrogenated tallow ammonium, methyl benzyl diricinoleyl ammonium, methyl benzyl dicoco ammonium, methyl dibenzyl octadecyl ammonium, methyl dibenzyl hydrogenated tallow ammonium, methyl dibenzyl ricinoleyl ammonium, methyl dibenzyl coco ammonium, methyl tribenzyl ammonium, methyl trioctadecyl ammonium, methyl trihydrogenated tallow ammonium, methyl triricinoleyl ammonium, methyl tricoco ammonium, dibenzyl dicoco ammonium, dibenzyl dihydrogenated tallow ammonium, dibenzyl dioctadecyl ammonium, dibenzyl diricinoleyl ammonium, tribenzyl coco ammonium, tribenzyl hydrogenated tallow ammonium, tribenzyl dioctadecyl ammonium, tribenzyl coco ammonium, tribenzyl ricinoleyl ammonium, and mixtures thereof, and wherein the amount of quaternary ammonium compound is from about 75 to about 120 milliequivalents per 100 grams of clay, 100% active clay basis.

14. The slurry of claim 1, 2, 3, 4, 5, 6, 7, 8, 9, or 10, wherein said organophilic clay is selected from the group consisting of dimethyl dihydrogenated tallow ammonium bentonite, methyl benzyl dihydrogenated tallow ammonium bentonite, and mixtures thereof, wherein the amount of quaternary ammonium compound is from about 75 to about 120 milliequivalents per 100 grams of bentonite, 100% active clay basis.

15. The method of producing an organophilic clay slurry which comprises extruding a mixture containing a smectite clay, from about 75 to about 120 millequivalents per 100 grams of 100% active clay of a quaternary ammonium salt comprising a quaternary ammonium cation and an anion having the structural formula:

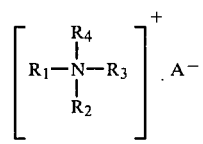

where A is an anion selected from the group consisting of Cl, Br, I, $NO_2$, OH, $NO_3$, $CH_3SO_4$, and mixtures thereof, and $R_1$, $R_2$, $R_3$, and $R_4$ are independently selected from the group consisting of $C_aH_{2a+1-x}B_x$, $C_bH_{2b-1-x}B_x$, $C_6H_{5-x}B_xCH_2$, and mixtures thereof, where $1 \leq a \leq 30$, $3 \leq b \leq 30$, $0 \leq x \leq 2$, and B is a radical selected from the group consisting of OH, Cl, Br, $C_6H_5$ and mixtures thereof, wherein at least one R contains at least 12 carbon atoms, and wherein said quaternary ammonium cation contains at least 20 carbon atoms, from about 15% to about 100%, based on the weight of 100% active clay, of water, from about 5% to about 50%, based on the weight of 100% active clay, of a first alcohol containing from 1 to 5 carbon atoms, and from about 0% to about 20%, based on the weight of the organophilic clay of an alkali metal carbonate, and thereafter shearing said extruded organophilic clay in an aqueous solution of a low molecular weight polar organic compound wherein the concentration of said compound is from about 2.5% to about 97.5% by weight of said solution, wherein said slurry contains from about 20% to about 40% organophilic clay, wherein the ratio of water to said first alcohol plus said polar organic compound in said slurry is in the range from about 97.5/2.5 to about 5/95, and wherein said polar organic compound is selected from the group consisting of alcohols containing from 1 to 6 carbon atoms, ketones containing from 3 to 6 carbon atoms, nitroalkanes containing from 1 to 3 carbon atoms, alkylene carbonates containing from 3 to 4 carbon atoms, amides containing from 1 to 4 carbon atoms, esters containing from 2 to 4 carbon atoms, and mixtures thereof, wherein said solutions contains:

(a) from about 20% to about 65% methanol when said compound is methanol;

(b) from about 10% to about 65% ethanol when said compound is ethanol;

(c) from about 2.5% to about 50% of an alcohol containing three carbon atoms when said compound is said alcohol;

(d) from about 2.5% to about 35% of an alcohol containing four carbon atoms when said compound is said alcohol; and (e) from about 2.5% to about 20% of an alcohol containing five carbon atoms when said compound is said alcohol.

16. The method of claim 15 wherein said smectite clay is bentonite, said quaternary ammonium cation is dimethyl dihydrogenatedtallow or methyl benzyl dihydrogenatedtallow, said first alcohol is isopropanol, and said polar organic compound is selected from the group consisting of alcohols containing from 1 to 5 carbon atoms, acetone, methyl ethyl ketone, dimethyl formamide, propylene carbonate, and mixtures thereof.

17. The method of activating an organophilic clay for enhanced dispersibility in an oleaginous liquid which comprises mixing said organophilic clay with an aqueous solution of a low molecular weight polar organic compound, wherein the concentration of said compound is from about 2.5% to about 97.5% by weight of said solutions, to produce a pumpable slurry containing from about 20% to about 50% of said organophilic clay, wherein said solutions contains:

(a) from about 20% to about 65% methanol when said compound is methanol;

(b) from about 10% to about 65% ethanol when said compound is ethanol;

(c) from about 2.5% to about 50% of an alcohol containing three carbon atoms when said compound is said alcohol;
(d) from about 2.5% to about 35% of an alcohol containing four carbon atoms when said compound is said alcohol; and
(e) from about 2.5% to about 20% of an alcohol containing five carbon atoms when said compound is said alcohol.

18. The method of claim 17 wherein said organophilic clay is the reaction product of a smectite clay selected from the group consisting of montmorillonite, hectorite, saponite, stevensite, and mixtures thereof, and a quaternary ammonium compound comprising a quaternary ammonium cation and an anion having the structural formula:

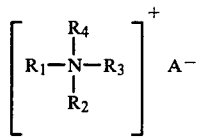

where A is an anion selected from the group consisting of Cl, Br, I, $NO_2$, OH, $NO_3$, $CH_3SO_4$, and mixtures thereof, and $R_1$, $R_2$, $R_3$, and $R_4$ are independently selected from the group consisting of $C_aH_{2a+1-x}B_x$, $C_bH_{2b-1-x}B_x$, $C_6H_{5-x}B_xCH_2$, and mixtures thereof, where $1 \leq a \leq 30$, $3 \leq b \leq 30$, $0 \leq x \leq 2$, and B is a radical selected from the group consisting of OH, Cl, Br, $C_6H_5$ and mixtures thereof, wherein at least one R contains at least 12 carbon atoms, and wherein said quaternary ammonium contains at least 20 carbon atoms.

19. The method of claim 18 wherein the quaternary ammonium cation is selected from the group consisting of trimethyl octadecyl ammonium, trimethyl ricinoleyl ammonium, dimethyl didodecyl ammonium, dimethyl diotadecyl ammonium, dimethyl dicoco ammonium, dimethyl dihydrogenatedtallow ammonium, dimethyl diricinoleyl ammonium, dimethyl benzyl octadecyl ammonium, dimethyl benzyl hydrogenatedtallow ammonium, dimethyl benzyl ricinoleyl ammonium, methyl benzyl dioctadecyl ammonium, methyl benzyl dihydrogenatedtallow ammonium, methyl benzyl diricinoleyl ammonium, methyl benzyl dicoco ammonium, methyl dibenzyl octadecyl ammonium, methyl dibenzyl hydrogenatedtallow ammonium, methyl dibenzyl ricinoleyl ammonium, methyl dibenzyl coco ammonium, methyl tribenzyl ammonium, methyl trioctadecyl ammonium, methyl trihydrogenatedtallow ammonium, methyl triricinoleyl ammonium, methyl tricoco ammonium, dibenayl dicoco ammonium, dibenzyl dihydrogenatedtallow ammonium, dibenzyl diotadecyl ammonium, dibenzyl diricinoleyl ammonium, tribenzyl coco ammonium, tribenzyl hydrogenatedtallow ammonium, tribenzyl diotadecyl ammonium, tribenzyl coco ammonium, tribenzyl ricinoleyl ammonium, and mixtures thereof, and wherein the amount of quaternary ammonium compound is from about 75 to 120 milliequivalents per 100 grams of clay, 100% active clay basis.

20. The method of producing an organophilic clay gellant which comprises extruding a mixture containing a smectite clay, from about 75 to about 120 milliequivalents per 100 grams of 100% active clay of a quaternary compound selected from the group consisting of quaternary ammonium salts, quaternary phosphonium salts, and mixtures thereof, from about 15% to about 100%, based on the weight of 100% active clay, of water, from about 5% to about 50%, based on the weight of 100% active clay, of an alcohol containing from 1 to 5 carbon atoms, and from 0% to about 20%, based on the weight of said organophilic clay, of an alkali metal base selected from the group consisting of sodium carbonate, potassium carbonate, and mixtures thereof, and thereafter grinding the organophilic clay without drying the water or alcohol therefrom.

21. The method of increasing the viscosity of an organic liquid which comprises mixing with said organic liquid a viscosifying amount of the organophilic clay slurry of claim 1, 2, 3, 4, 5, 6, 7, 8, 9, 10, 15, 16, 17, 18, or 19.

* * * * *